US010014583B2

(12) United States Patent
Lim et al.

(10) Patent No.: US 10,014,583 B2
(45) Date of Patent: Jul. 3, 2018

(54) MEANDER-TYPE, FREQUENCY-SCANNED ANTENNA WITH REDUCED BEAM SQUINT FOR AN AUTOMATED VEHICLE RADAR SYSTEM

(71) Applicant: Delphi Technologies, Inc., Troy, MI (US)

(72) Inventors: Chan-Ping E. Lim, Westlake Village, CA (US); Shawn Shi, Thousand Oaks, CA (US)

(73) Assignee: Delphi Technologies, Inc., Troy, MI (US)

( * ) Notice: Subject to any disclaimer, the term of this patent is extended or adjusted under 35 U.S.C. 154(b) by 16 days.

(21) Appl. No.: 15/292,754

(22) Filed: Oct. 13, 2016

(65) Prior Publication Data

US 2018/0109000 A1 Apr. 19, 2018

(51) Int. Cl.

*H01Q 13/10* (2006.01)
*H01Q 1/36* (2006.01)
*G01S 13/93* (2006.01)
*G01S 13/06* (2006.01)

(52) U.S. Cl.

CPC ............. *H01Q 13/10* (2013.01); *G01S 13/06* (2013.01); *G01S 13/931* (2013.01); *H01Q 1/36* (2013.01)

(58) Field of Classification Search

CPC ............ H01Q 13/10; H01Q 1/36; H01Q 1/32; H01Q 1/38
USPC .......................................................... 343/770
See application file for complete search history.

(56) References Cited

U.S. PATENT DOCUMENTS 3,430,247 A 2/1969 Wong
7,079,079 B2 * 7/2006 Jo .......................... H01Q 1/243 343/700 MS
7,375,697 B2 * 5/2008 Lee .................. G06K 19/07771 343/767
2004/0174315 A1 9/2004 Miyata
2010/0289717 A1 * 11/2010 Arslan ..................... H01Q 1/38 343/876
2011/0156973 A1 * 6/2011 Focke ...................... H01Q 1/38 343/753
2015/0263429 A1 9/2015 Vahidpour et al.

* cited by examiner

*Primary Examiner* — Dameon E Levi
*Assistant Examiner* — Hasan Islam
(74) *Attorney, Agent, or Firm* — Lawrence D. Hazelton

(57) ABSTRACT

A meander-type, frequency-scanned antenna with reduced beam squint suitable for use on an automated vehicle radar system includes a plurality of parallel sub-arrays, each sub-array equipped with a plurality of radiators. The antenna is formed by a serpentine-arrangement of a continuous-strip of material. The serpentine-arrangement configured so a first sub-array characterized by a signal propagating in a first-direction is adjacent to a second sub-array characterized by the signal propagating in a second-direction opposite the first-direction. The first sub-array and the second sub-array are each further configured to define a plurality of radiators configured such that a radar-beam emitted by the antenna in response to the signal is characterized by a direction-angle that is substantially unchanged when a frequency of the signal is varied.

4 Claims, 4 Drawing Sheets

Input
18
12
10
14

MEANDER-TYPE, FREQUENCY-SCANNED ANTENNA WITH REDUCED BEAM SQUINT FOR AN AUTOMATED VEHICLE RADAR SYSTEM

TECHNICAL FIELD OF INVENTION

This disclosure generally relates to a radar antenna, and more particularly relates to an antenna formed of arrays of sub-arrays where each sub-array has a plurality of radiators configured such that a radar-beam emitted by the antenna in response to a signal is characterized by a direction-angle that is substantially unchanged when a frequency of the signal is varied.

BACKGROUND OF INVENTION

It is known to equip automated vehicles with radar systems that scan (i.e. change a beam direction of) a radar-beam on the azimuth plane by varying or sweeping the frequency of the radar-signal emitted by the system and reflected by a nearby object. Preferably, the antenna of the system is configured or designed such that the nominal direction of the radar-signal does vary with frequency. For example, it is preferable for the antenna to exhibit zero beam squint on the elevation plane.

SUMMARY OF THE INVENTION

It is known that an elevation angle of a radar-beam emitted from a single linear vertical arrangement of interconnected radiators may vary with the carrier frequency of the radar-beam. That is, the elevation angle may increase/decrease as the frequency varies. For reasons beyond the scope of this disclosure, there are certain advantages realized by a radar system if the carrier frequency of a radar signal is varied, e.g. chirped. This variation in elevation angle is sometimes referred to as beam squint. To overcome the problem of beam squint, the antenna described herein is configured so alternating instances of the aforementioned vertical arrangement of interconnected radiators (i.e. sub-arrays of radiators) cooperate so the upward squint of one sub-array is generally cancelled or offset by the downward squint of an adjacent sub-array.

In accordance with one embodiment, a meander-type, frequency-scanned antenna with reduced beam squint suitable for use on an automated vehicle radar system is provided. The antenna includes a plurality of parallel sub-arrays, and each sub-array is equipped with a plurality of radiators. The antenna is formed by a serpentine-arrangement of a continuous-strip of material. The serpentine-arrangement configured so a first sub-array characterized by a signal propagating in a first-direction is adjacent to a second sub-array characterized by the signal propagating in a second-direction opposite the first-direction. The first sub-array and the second sub-array are each further configured to define a plurality of radiators configured such that a radar-beam emitted by the antenna in response to the signal is characterized by a direction-angle that is substantially unchanged when a frequency of the signal is varied.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
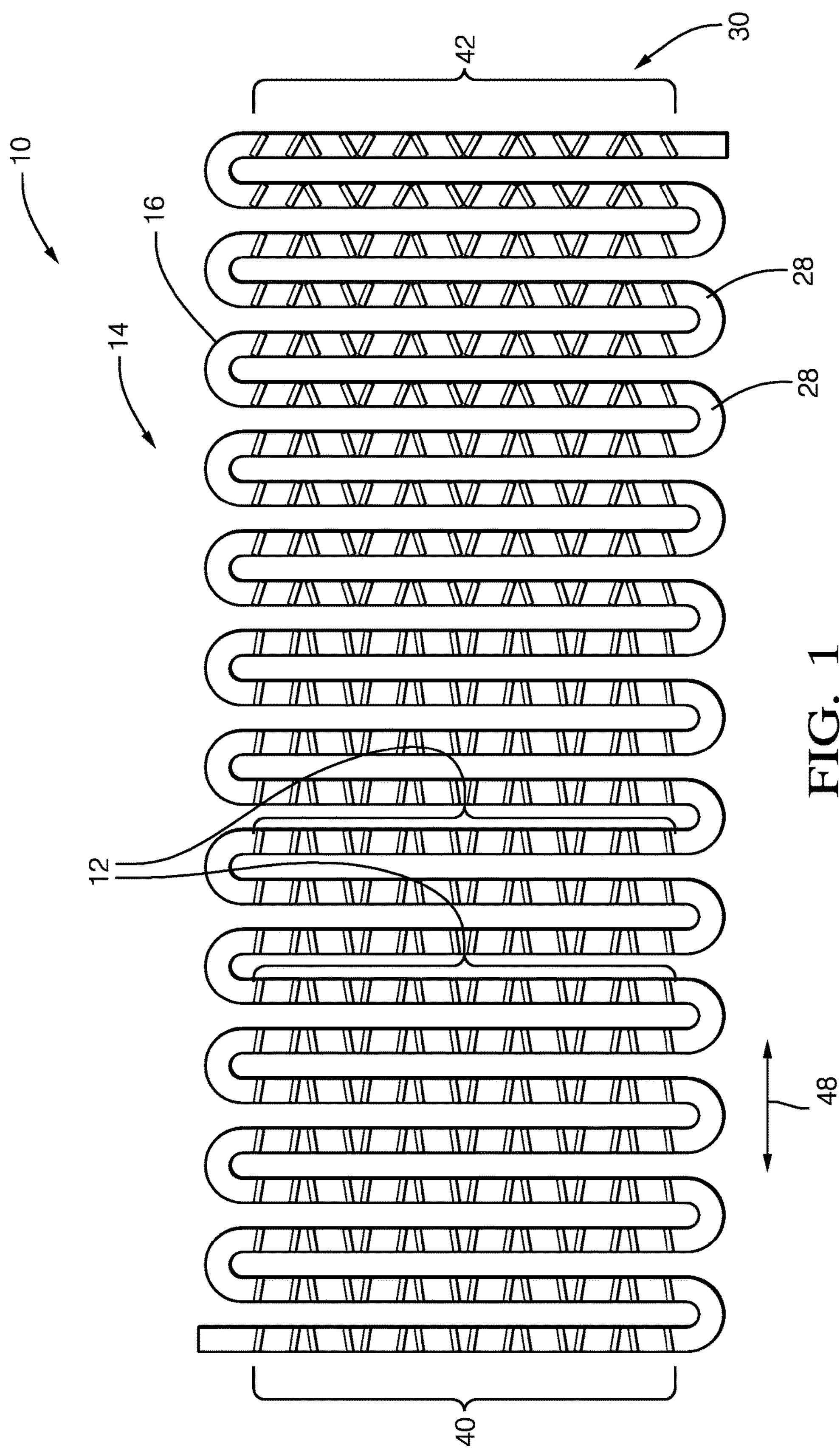
FIG. 1 is a front view of a meander-type, frequency-scanned antenna in accordance with one embodiment.

FIG. 1 illustrates a non-limiting example of a meander-type, frequency-scanned antenna 10, hereafter referred to as the antenna 10. Although not specifically shown, those in the art will instantly recognize that the antenna 10 may be located upon or attached to a substrate and electrically coupled to a radar-transceiver when the antenna 10 is used for radar applications. As will be explained in more detail later, the antenna 10 is an improvement over prior examples as the antenna 10 provides for reduced or zero beam squint in the elevation plane when the antenna 10 is oriented as described herein.

By way of example and not limitation, the antenna 10 may be formed or fabricated using known printed-circuit-board (PCB) photo-etching techniques that remove unwanted areas from a sheet of copper foil overlying a substrate (not shown) formed of a material suitable for the intended operating frequency of the antenna 10, as will be well-recognized by those in the art. By way of further example, the substrate may be 0.13 mm thick formed of the material used for the RO3003 laminate from Rogers Corporation.

It is contemplated that the antenna 10 described herein is particularly suitable for use on an automated vehicle radar system. As used herein, the term 'automated vehicle' is not meant to suggest that fully automated or autonomous operation of the automated vehicle (not shown) is required, although that is an option. It is contemplated that the teachings presented herein are applicable to instances where the automated vehicle is entirely manually operated by a human-operator (not shown) except for automated target detection by a radar system that uses the antenna 10, where the system may merely activate an audible and/or visible warning to warn the human-operator of the presence of an object or a target proximate to the automated vehicle. That is, the automated vehicle may be operable in an automated-mode which may be a fully autonomous type of operation where the human-operator does little more than designate a destination, and/or the automated vehicle may be operable in a manual-mode where the human-operator generally controls the steering, accelerator, and brakes of the automated vehicle. It is also contemplated that the teachings present herein are applicable to non-automotive applications where radar is used, for example, by a security system to detect the presence of humans or vehicles.

Figure 2:
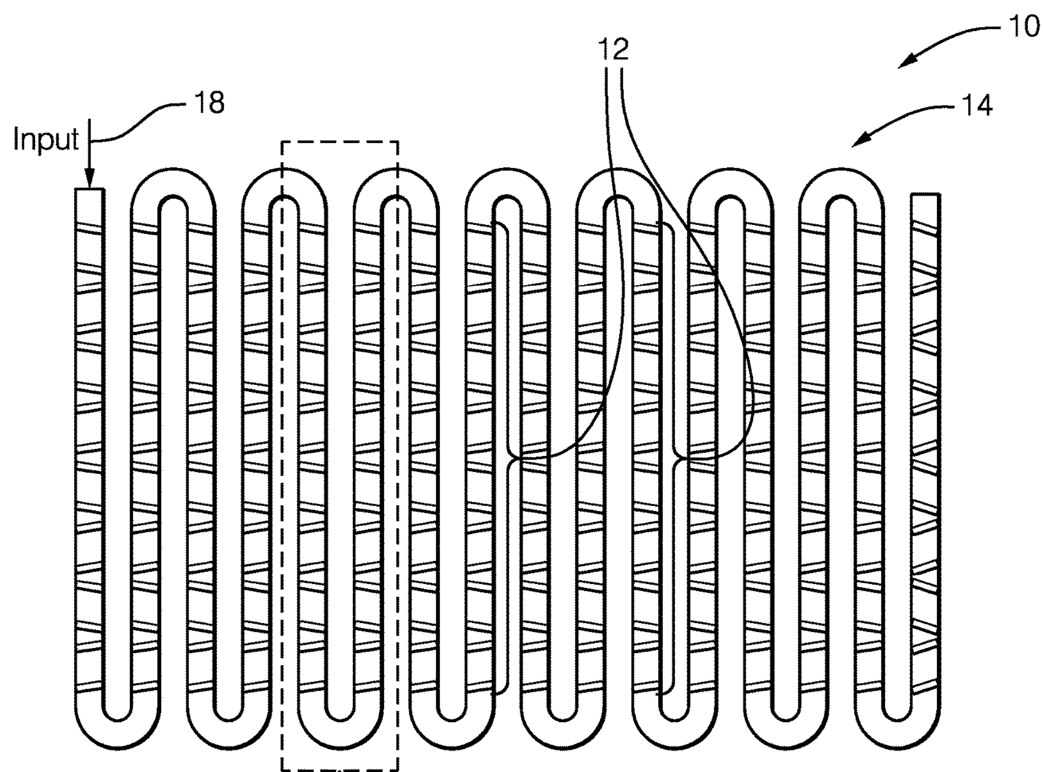
FIG. 2 is another view of the antenna of FIG. 1 in accordance with one embodiment.
Figure 2A:
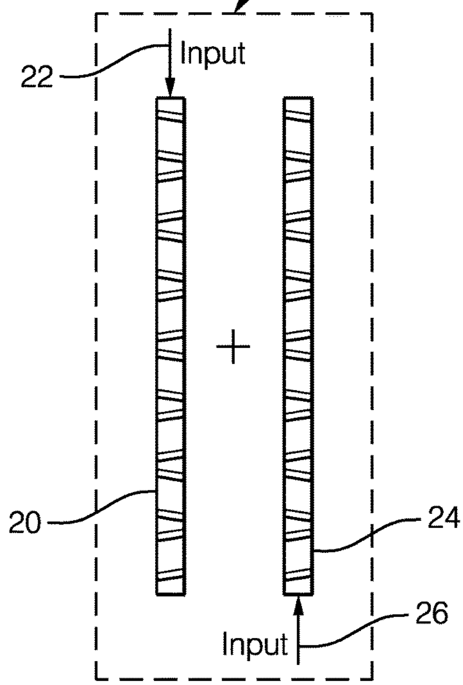
FIG. 2A is a magnified view of a portion of the antenna of FIG. 2 in accordance with one embodiment.
Figure 2B:
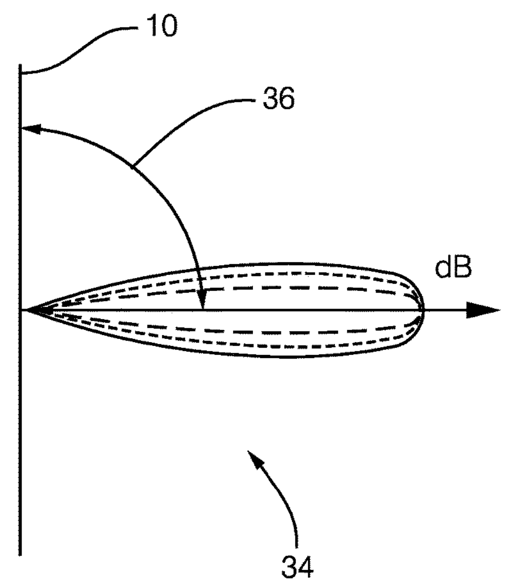
FIG. 2B is a side view of the antenna of FIG. 2 in accordance with one embodiment.

FIGS. 2, 2A, and 2B illustrate further non-limiting details about the antenna 10. The antenna 10 is configured to include or define a plurality of parallel sub-arrays 12 formed by a serpentine-arrangement 14 of a continuous-strip 16 of, for example, conductive-material such as copper foil. Alternatively, the continuous-strip 16 may be non-conductive such a dielectric-material or an optical-fiber configured with features known to those in the art so the continuous-strip 16 can be used as a radar antenna. The serpentine-arrangement 14 is configured so a first sub-array 20 characterized by a signal 18 propagating in an first-direction 22 is adjacent to a second sub-array 24 characterized by the signal 18 propagating in a second-direction 26 opposite the first-direction 22. That is, because the serpentine-arrangement 14 includes loop-around ends 28 interconnecting each instance of the plurality of parallel sub-arrays 12, the signal 18 injected at one end of the antenna 10 travels back and forth, or up and down in this illustration, through successive instances of sub-array that make up the plurality of parallel sub-arrays 12. The signal-path for the signal 18 to propagate is defined by the antenna 10 so the signal direction in any one instance of sub-array is traveling in a direction opposite to that of an adjacent (i.e. next or prior) instance of sub-array. As indicated by the magnified illustration of the first sub-array 20 and the second sub-array 24, each instance of sub-array consists of the straight portions of the antenna 10 interconnecting each successive instance of the loop-around ends 28.

The first sub-array 20 and the second sub-array 24 are each further configured to define a plurality of radiators 30, hereafter referred to as the radiators 30. As will be recognized by those in the art, the antenna 10 may be more generically referred to as a meander line, which could be any type of transmission line such as, but not limited to, a waveguide, a microstrip, a substrate integrated waveguide (SIW), a co-planar-waveguide, a coax, or a stripline. It will also be recognized that the radiators 30 could be any type of radiating element such as, but not limited to, slot, patch, dipole, or monopole type radiators. When antennas are designed, a first consideration is the performance and cost requirements. Based on the requirements, the type of transmission line is selected, and in that context, waveguide versus microstrip. Next, the type of radiator is selected, where, for example, a slot-radiator is easier to integrate with a waveguide, and a microstrip patch is easier to integrate with a microstrip line.

The plurality of radiators 30 or the plurality of parallel sub-arrays 12 that form the antenna 10 is configured such that a radar-beam 32 illustrated as being emitted horizontally from the antenna 10 in the side-view 34 (FIG. 2B) in response to the signal 18 is characterized by a direction-angle 36 (which may alternatively be referred to as an elevation-angle) that is substantially unchanged when a frequency (not shown, but a well-known characteristic of any radio-frequency signal) of the signal 18 is varied.

Figure 3B:
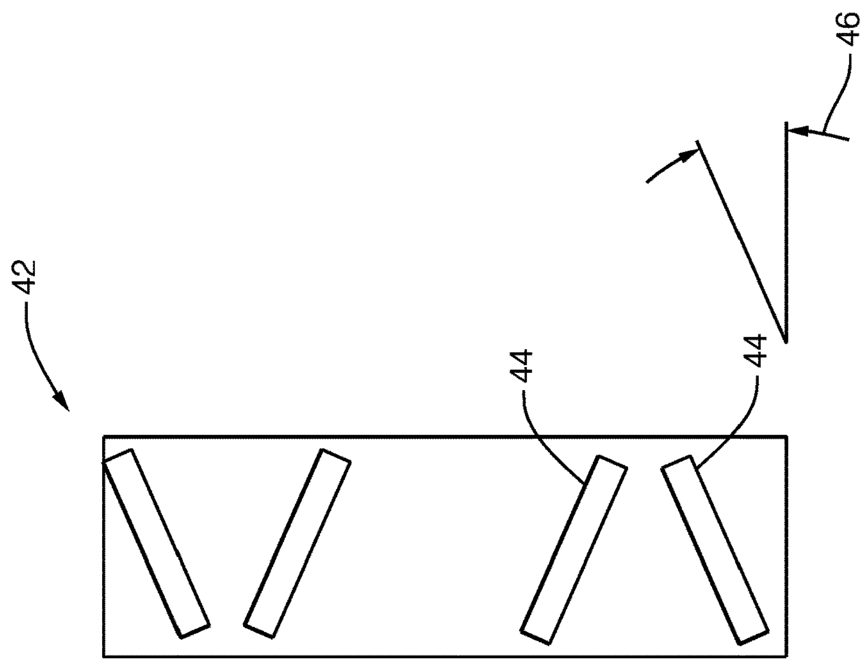
FIGS. 3A and 3B are magnified views of the antenna of FIG. 1 in accordance with one embodiment.
Figure 3A:
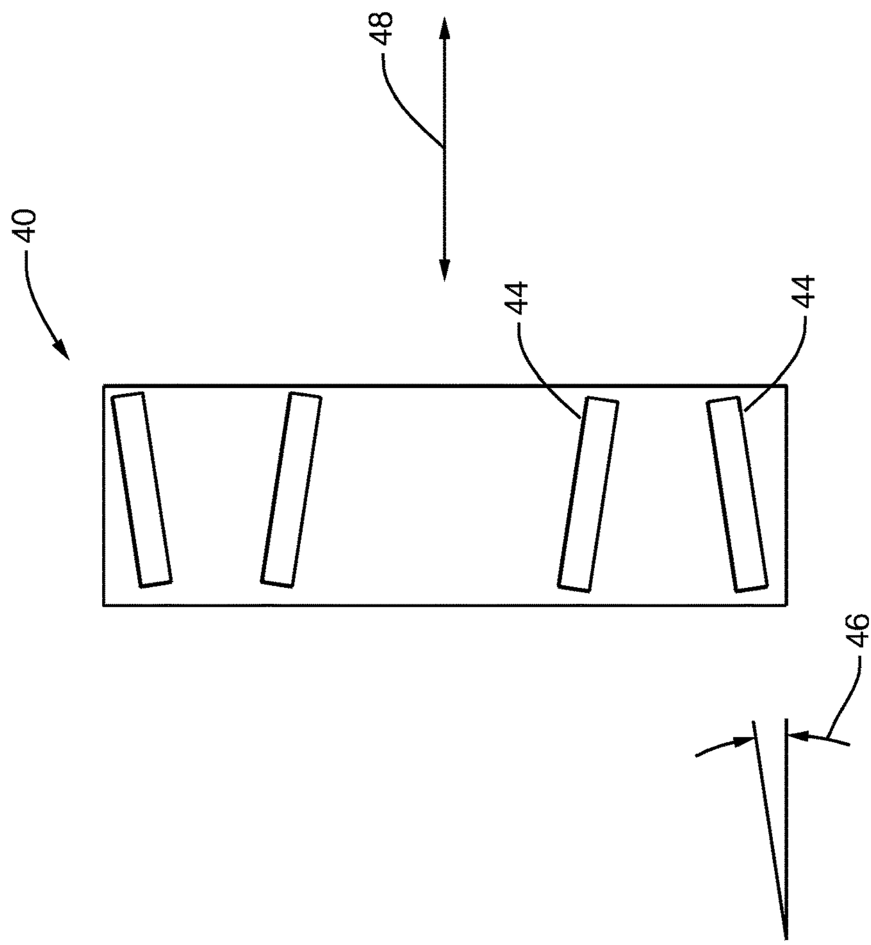

FIGS. 3A and 3B further illustrate details of the antenna 10. FIG. 3A shows a magnified view of a portion of a left sub-array 40, and FIG. 3B shows a magnified view of a portion of a right sub-array 42. As used herein, the modifiers 'left' and 'right' are only relative terms used in view of the drawings described herein, and not meant to suggest that a left/right relationship is required. Indeed, the illustration shown in FIG. 1 could be reversed or rotated 180° and the antenna 10 would still operate as described herein. In this non-limiting example, the radiators 30 are characterized as slot-radiators 44, where the slot-radiators 44 are characterized by a slot-angle 46 measured with respect to an axis 48 of the serpentine-arrangement 14.

In this non-limiting example, each instance of a slot-radiator 44 in the first sub-array corresponds to an instance of a slot-radiator 44 in the second sub-array, and the slot-angles 46 of corresponding instances of slot-radiators 44 are selected to provide a monotonic progression vary across the plurality of parallel sub-arrays 12. Preferably, angle-increments defined by the monotonic progression are selected to reduce side-lobes on an azimuth-pattern (not shown) of the antenna 10. Eq. 1 is used to determine the slot-angle 46 (in degrees of angle) for each i-th instance of the plurality of parallel sub-arrays 12 where n=1 corresponds to the left sub-array 40 and n=25 corresponds to the right sub-array 42.

$$Ai=\text{sum }(n=1\text{ to }i)\ [Cn] \qquad \text{Eq. 1.}$$

A list of coefficients for the antenna 10 shown in FIG. 1 was selected/optimized using a computer simulation of the antenna 10 is as follows: C1=8.53, C2=0.66, C3=0.77, C4=0.60, C5=0.13, C6=0.08, C7=1.57, C8=0.14, C9=1.50, C10=0.21, C11=0.54, C12=0.13, C13=0.90, C14=1.42, C15=0.04, C16=1.48, C17=1.62, C18=0.17, C19=0.96, C20=0.78, C21=1.85, C22=1.42, C23=0.08, C24=0.32, C25=2.04.

Figure 4:
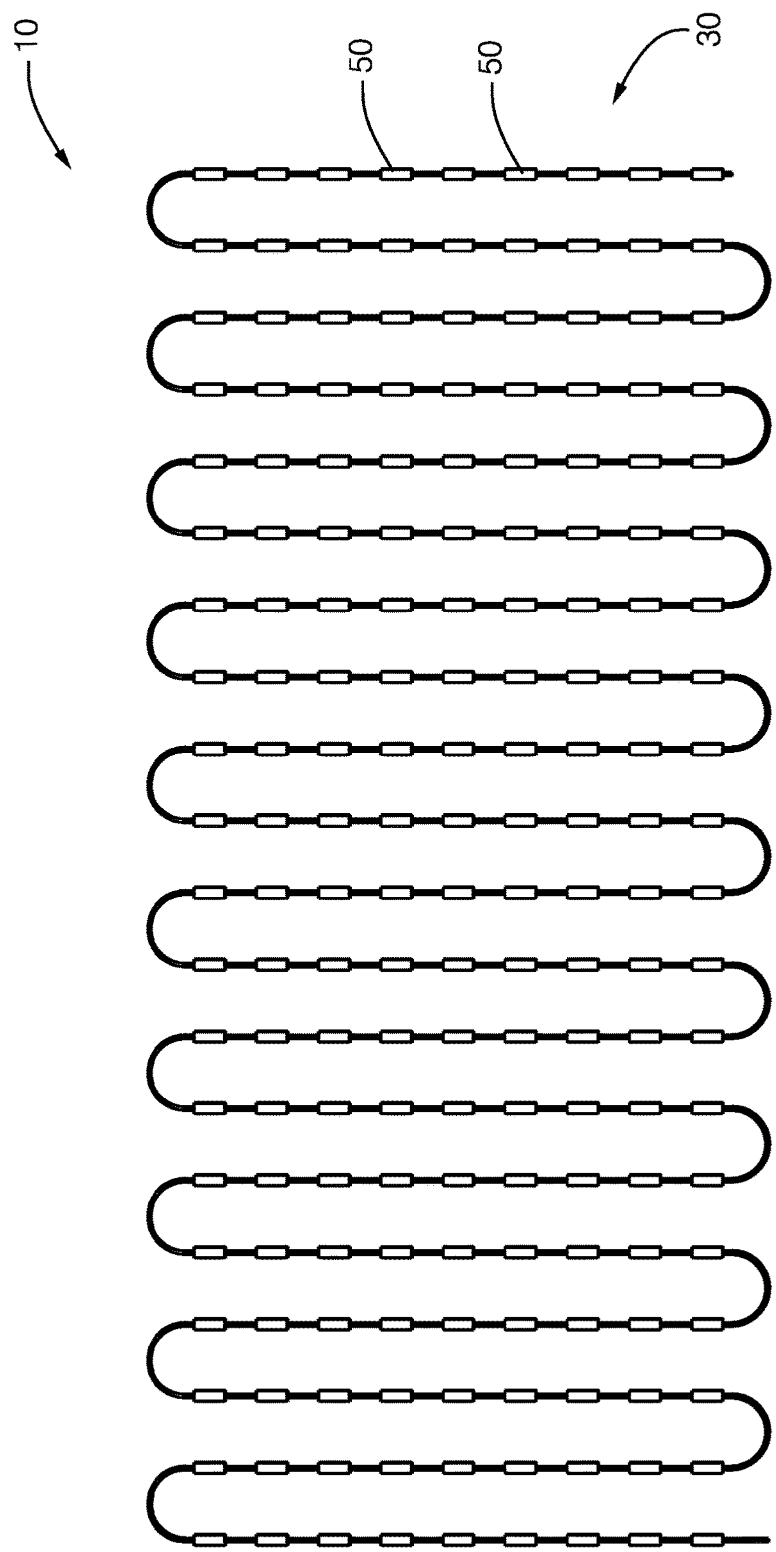
FIG. 4 is a front view of an alternative configuration of the antenna of FIG. 1 in accordance with one embodiment.

FIG. 4 illustrates another non-limiting example of the antenna 10 where the radiators 30 are characterized as patch-radiators 50. While using the patch-radiators 50 instead of the slot-radiators 44 does not provide for higher efficiency, using the patch-radiators 50 in some instances does provide for a more economical design when a microstrip line is being used. While using the patch-radiator 50, one of the methods to reduce side-lobes on an azimuth pattern is varying the width of the patch-radiators (not shown).

Accordingly, a meander-type, frequency-scanned antenna (the antenna 10) is provided. As shown in FIG. 1, the antenna 10 consists of multiple columns of sub arrays (the plurality of parallel sub-arrays 12). Each sub-array column has multiple radiators. The sub-arrays and radiators are not limited by any number, but the number of sub-arrays and radiators influences the gain and both azimuth and elevation pattern beam-widths. FIG. 2A shows the first sub-array 20 being fed from the top and this leads to patterns squinting downward (i.e. negative angles) as frequency increases. On the other hand, the second sub-array 24 is being feed from the bottom, so the patterns squint upward which correspond to the positive angles. With this phenomenon in mind, two adjacent instances of sub-array are designed in pairs with inputs that are phase matched, but opposite in direction. This combination of pair results in superposition of both positive and negative angles patterns, leading to reduced and possibly zero beam squint in the elevation plane, as shown in FIG. 2B. To form pairs of sub-arrays, it would seem obvious that the total of sub-arrays would be an even number. However, it was discovered that an odd number of sub-arrays can also achieve zero elevation beam squint when the input level in last column is relatively weaker than the other sub-arrays. A frequency-scanned antenna using configuration described herein can achieve a narrow pencil beam that scans a large angle range in the azimuth without elevation beam squint, and is able to do so with a minimal number of stack-up layers in an underlying substrate. Furthermore, it should be noted that although the meander transmission lines demonstrated in this context are waveguide, the same concept can also be easily implemented in microstrip lines, strip-lines, substrate integrated waveguides (SIWs), etc.

Further non-limiting details about the antenna 10 shown in FIG. 1 include that the antenna 10 may be implemented on a 2.54 mm×1.47 mm air-filled waveguide and a single copper layer printed circuit board (PCB) with etched slots. The twenty-five sub-arrays and each include sixteen slot-radiators. Each slot radiator is 1.25 mm×0.2 mm. The two slot-to-slot separations are 0.99 mm and 1.95 mm. On each sub-array, the slots are tilted at different angles for side-lobe control on the azimuth patterns. The sub-array-to-sub-array separation is 2.74 mm. Input is fed at the top left corner. This configuration will provide for zero beam squint and a 3 dB beam-width less than 11-degree across a frequency range of 77 GHz-81 GHz, and azimuth patterns with beam scans between −25 degrees and +22 degree across 77 GHz-81 GHz with at least 12 dB side-lobe level.

In summary, the advantages of the antenna 10 shown in FIG. 1 include: (1) Provides desired narrow beam-width in elevation with zero beam squint; (2) Provides desired azimuth scanning with pencil beam patterns; (3) Does not require an additional layer of microstrip series-fed patches or lens; and (4) Leads to a low cost and high efficiency frequency-scanned antenna.

While this invention has been described in terms of the preferred embodiments thereof, it is not intended to be so limited, but rather only to the extent set forth in the claims that follow.

We claim:

1. A meander-type, frequency-scanned antenna with reduced beam squint suitable for use on an automated vehicle radar system, said antenna comprising:

a plurality of parallel sub-arrays formed by a serpentine-arrangement of a continuous-strip of material, said serpentine-arrangement configured so a first sub-array characterized by a signal propagating in a first-direction is adjacent to a second sub-array characterized by the signal propagating in a second-direction opposite the first-direction, wherein the first sub-array and the second sub-array are each further configured to define a plurality of radiators configured such that a radar-beam emitted by the antenna in response to the signal is characterized by a direction-angle that is fixed when a frequency of the signal is varied, wherein the radiators are characterized as slot-radiators, wherein the slot-radiators are characterized by a slot-angle measured with respect to an axis of the serpentine-arrangement, wherein each instance of a slot-radiator in the first sub-array corresponds to an instance of a slot-radiator in the second sub-array, and the slot-angles of corresponding instances of slot-radiators are selected to provide a monotonic progression vary across the plurality of sub-arrays.

2. The antenna in accordance with claim 1, wherein the antenna includes loop-around ends that interconnect each instance of the plurality of parallel sub-arrays.

3. The antenna in accordance with claim 1, wherein angle-increments defined by the monotonic progression are selected to reduce side-lobes on an azimuth-pattern of the antenna.

4. The antenna in accordance with claim 1, wherein the radiators are characterized as patch-radiators.

* * * * *